United States Patent
Prajapat

(10) Patent No.: US 9,961,116 B2
(45) Date of Patent: May 1, 2018

(54) METHOD AND SYSTEM FOR PROVIDING REMOTE TRANSCODING OF MEDIA DATA ON A VOIP SYSTEM

(71) Applicant: Edgewater Networks, Inc., San Jose, CA (US)

(72) Inventor: Surendra Prajapat, Cupertino, CA (US)

(73) Assignee: Edgewater Networks, Inc., San Jose, CA (US)

(*) Notice: Subject to any disclaimer, the term of this patent is extended or adjusted under 35 U.S.C. 154(b) by 15 days.

(21) Appl. No.: 14/642,244

(22) Filed: Mar. 9, 2015

(65) Prior Publication Data
US 2016/0149984 A1 May 26, 2016

Related U.S. Application Data

(60) Provisional application No. 62/085,061, filed on Nov. 26, 2014.

(51) Int. Cl.
*H04L 29/06* (2006.01)
*H04L 29/12* (2006.01)

(52) U.S. Cl.
CPC ........ *H04L 65/1069* (2013.01); *H04L 65/602* (2013.01); *H04L 65/80* (2013.01); *H04L 61/1529* (2013.01)

(58) Field of Classification Search
CPC ............. H04L 61/1529; H04L 65/1069; H04L 65/607
USPC ......................................................... 370/329
See application file for complete search history.

(56) References Cited

U.S. PATENT DOCUMENTS

| 8,611,338 B2* | 12/2013 | Lawson | H04M 7/0021 370/352 |
| 8,804,697 B1* | 8/2014 | Capper | H04L 65/00 370/352 |
| 2005/0237931 A1* | 10/2005 | Punj | H04L 29/06027 370/229 |
| 2007/0064743 A1* | 3/2007 | Bettis | H04L 12/58 370/503 |

(Continued)

*Primary Examiner* — Asad Nawaz
*Assistant Examiner* — Saad A Waqas
(74) *Attorney, Agent, or Firm* — Brooks, Cameron & Huebsch, PLLC

(57) ABSTRACT

Techniques for providing remote transcoding of call media data on a communications network are disclosed. The techniques include a communication module receiving a call request from a first communication device, transmitting a call invite to a second communication device, receiving a response from the second communication device, determining a first media encoding requirement for media transmitted to the first communication device and a second media encoding requirement for media transmitted to the second communication device, and transmitting information regarding the first communication device, the second communication device, the first media encoding requirement, and the second media encoding requirement to a transcoding module operating on a computer server. The techniques include the transcoding module receiving first call media data from the first communication device, transcoding the first call media data, and transmitting the transcoded first call media data to the second communication device.

18 Claims, 5 Drawing Sheets

(56) References Cited

U.S. PATENT DOCUMENTS

| | | | |
|---|---|---|---|
| 2007/0291776 A1* | 12/2007 | Kenrick | H04L 29/06027 370/401 |
| 2010/0002606 A1* | 1/2010 | Preis | H04Q 3/0025 370/259 |
| 2013/0166580 A1* | 6/2013 | Maharajh | H04L 65/605 707/758 |
| 2014/0379823 A1* | 12/2014 | Wilsher | H04L 12/287 709/206 |

* cited by examiner

METHOD AND SYSTEM FOR PROVIDING REMOTE TRANSCODING OF MEDIA DATA ON A VOIP SYSTEM

RELATED APPLICATIONS

The present application claims the benefit of U.S. Provisional Application Ser. No. 62/085,061, filed Nov. 26, 2014, which is expressly incorporated herein in its entirety.

BACKGROUND INFORMATION

Field of the Disclosure

The present invention relates to managing and transcoding data within a computer communications system such as a VOIP system. An example provides for transcoding media data for a communications system as a service via a separate computer instead of via the VOIP system hardware.

Background

Many organizations such as businesses now use VOIP (Voice Over IP) communication systems which include telephones and associated equipment. VOIP communication systems provide many additional features over conventional telephone equipment and are desirable to end users. VOIP systems, however, often increase the cost of a communication system and the most feature rich VOIP equipment is typically the most expensive equipment. The expense of VOIP equipment is often an obstacle to implementation in many businesses. Another obstacle to implementation is that upgrading a VOIP system to handle a higher call volume often requires replacement of some of the system equipment.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
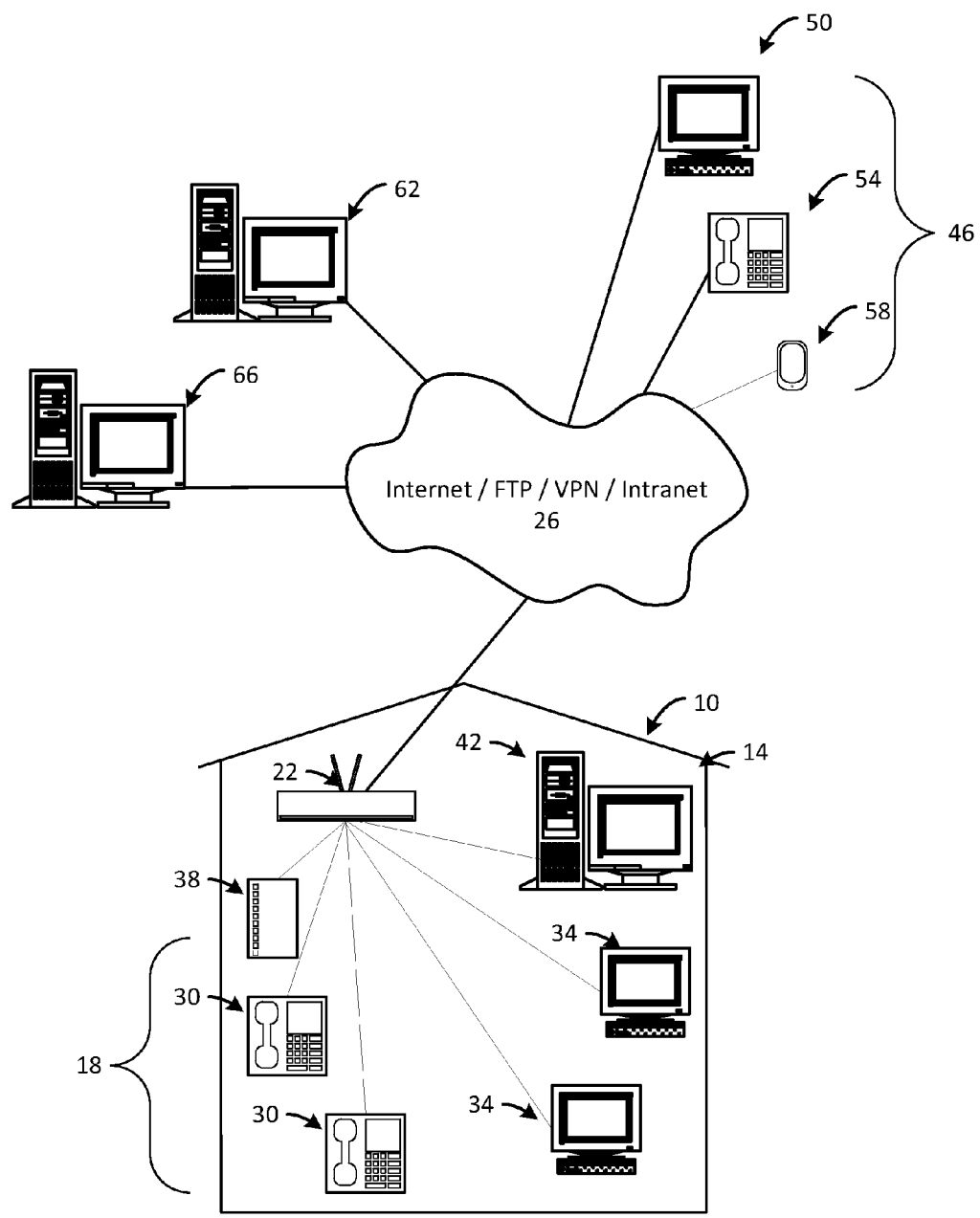
FIG. 1 is a schematic illustrating various aspects of a computer system according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The disclosure particularly describes how VOIP equipment such as a communication system including VOIP telephones may be constructed and/or managed to separate the transcoding from the local communication equipment.

Applicants have developed IP communication systems which remove portions of the data processing and handle the processing remotely. In particular, a remote server may be used to handle media transcoding and call routing and remove these functions from local communications equipment.

In communications systems such as a VOIP communication system, the ability to create a system which can handle a large number of calls and a large quantity of data throughput is limited by the expense of the system. Existing systems can be difficult to upgrade to increase call capacity and quality and may instead require replacement at significant expense.

Enterprise-level businesses will typically have communications systems which include a centralized device that handles call routing and is connected to multiple end devices such as phones. The system handles call routing as well as data transcoding. These systems suffer from several drawbacks. The system overall is underutilized in terms of the actual system use versus the system capacity. The system hardware must be designed to handle the worst case scenario; that each end device or each available line is being used simultaneously. Thus, the system much be built to handle a certain number of lines and to handle the data transcoding for each of those lines simultaneously. In order to increase the capacity of the system, system hardware must typically be replaced. In order to build a system which will have adequate capacity at a future date, the system must be overbuilt for the present date. Thus, either approach to meeting a targeted capacity is inefficient. Additionally, the data transcoding that a system will handle is typically fixed at the time of installation and it can be difficult to maintain compatibility with future codecs and future devices. There is a long development cycle for updating communications system hardware each time there is a change in capacity or capability.

Applicants have developed a system where data transcoding is separated from the business communications system and handled remotely. The transcoding is handled in a separate computer such as a cloud server. The transcoder server handles IP based traffic. The enterprise communications system performs signaling functions and will handle traffic to the phones within the business.

With a cloud based transcoding service, any device can use this service as a shared resource. The transcoding service can be more fully utilized and it can be offered as a third party service to multiple businesses. The cloud transcoder service can be scaled well as it is not tied to a particular hardware implementation and is not tied to a particular business communication system. The cloud transcoder service can be offered as a service to businesses and can thus be maintained by a third party, reducing the cost to the businesses.

Operating the transcoder service as software; e.g. in a cloud environment, the service is less expensive and easier to modify. Additionally, it does not require businesses to build the capability or capacity upfront. The transcoding system can be easily scaled and multiple instances of the software can operate on multiple servers to increase the capacity of the system. The transcoding system can be more easily updated to include new codecs and transcoding methods and can be more easily adapter to address new devices in the market. These transcoding system upgrades can be transparently applied to all of the business clients using the transcoding service. As discussed herein, a codec refers to the software used for the coding and decoding of media data (e.g. voice or video media data) according to a given encoding algorithm. The codec allows for the encoding of media data from the original signal format (e.g. analog audio) to another signal format (e.g. digital audio-typically compressed) and the decoding of the encoded media data to the original signal format. Transcoding thus may change encoded media data to another format of encoded media data.

The transcoding system separates the media portion out from a communication such as a VOIP call and handles the media transcoding. The signaling is handled by the business communications system.

Transcoding the media data is a CPU intensive operation and, if done in the DSP, the cost is high. Additionally, incompatibility between the devices which are communicating may prevent communication. For example, an enterprise service may operate using codecs such as G711 and G729. At the same time, web RTC does not support these codecs so it may be impossible to make a connection between a VOIP phone on the business system and a device operating under web RTC. Thus, the transcoding service has to support both the processing capacity as well as supporting all codecs needed to connect to create connection capability. With a remote transcoding service, new codecs can be added to the server and everybody can transparently start using them. It is easy to develop support for the new codecs on a server based platform. Similarly, it is easy to add a second cloud based server and run a second instance of the software to add capacity.

The remote transcoding system also allows for improved or better managed quality of service. The remote transcoding system may give a lower quality codec to a certain tier of enterprises and can give a high fidelity codec to another tier of enterprise. Different enterprises can be easily managed and be given different quality of media service based on their desired operational cost. It is also possible adjust the quality of service and select from a range of codecs based on certain use policies (use, payment etc.). A business may select a desired media bandwidth and may receive transcoding with a high fidelity codec at a low usage time period and may receive transcoding services with a lower fidelity codec during a high usage time. A companies selected bandwidth tier may not have enough bandwidth to give them during high call volume times of day versus low volume times of day and the transcoding service provides the ability to adjust the client's call quality to maintain their selected bandwidth tier.

The remote transcoding system also removes the responsibility to build the transcoding function from the CSP manufacturer. The CSP vendor does not spend time to do this and can use this as an outsourced service from a third party. The CSP vendor does not have to keep changing the transcoder functionality and can rely on a third party vendor to handle this processing. The CSP can focus on the signaling and routing and other functions within the communications equipment. The processing power necessary for call routing is cheap while the processing power to transcode is expensive and keeping up with all codecs is expensive. Thus, the remote transcoding service removes a significant cost from the development and manufacture of the business communications system equipment.

Currently, cheap VOIP hardware cannot provide a certain level of quality because the development and processing power necessary for certain codecs is too expensive for the price of the phone. Utilizing the remote transcoding system, a cheap VOIP system can utilize high fidelity and processor intensive codecs and transcoding because it is handled remotely at t third party server.

Additionally, phone or communications system is not outdated as quickly because it is not handling the codecs. The signaling components of a business system can be overbuilt to handle future expanded call capacity since this is cheap to build. The system components are not outdated by their inability to handle new codecs and they experience a longer service life.

A communications system is also able to easily integrate new end user devices (e.g. phones or tablets) as the system needs only handle the signaling and does not handle the transcoding. Where employees want to use tablets or other devices to make calls, the enterprise network needs to only route the call and the transcoding server can ensure compatibility with the tablet. Voice or video network at the enterprise can evolve and add new types of devices for new people and the central hardware can easily handle the additions because there is not a large change in the IP routing requirements. The new transcoding requirements are handled at a third party server which is easily updated to handle the transcoding.

Historically, a system cannot expand to newer devices as it is not built to handle the newer transcoding requirements. The system can only support the type of devices which existed at the time and the types of transcoding that existed at the time. Now, new devices and new transcoding types can be seamlessly added to the system. The IP routing for newer devices does not significantly change. The system needs to identify the IP address of the end point and transmit the data traffic and the data traffic and IP routing is easy capacity to build into the enterprise hardware. With the transcoding built into the remote transcoding system, new types of devices and new types of communication can be easily added to an existing system.

Referring to FIG. 1, an organization or entity 10 may operate a computer network 14 which includes various computer based communication devices. The organization may be a private entity, business, educational institution, government institution, etc. A person within the organization 10 may use a computer network 14 and one or more communication devices 18 to communicate (e.g. real time voice or video telephone calls) with another person who is either inside or outside of the organization 10 and organization network 14.

In one example, the computer network 14 may include a router/switch 22 which is used to connect the network 14 to the internet 26. The router 22 may be used to provide internet connection to the communication devices 18 such as VOIP telephones 30 or computers 34. By way of example, computers 34 may provide audio and video communications through various input and output devices such as cameras, microphones, and speakers. The network 14 may also include a computer 38 (e.g. a dedicated communications hardware or switch) or server 42 which facilitates communications and data transmission with the communications devices 18. Persons outside the network 14 may also use communications devices 46 such as a computer 50, VOIP phone 54, or a mobile electronic device 58 such as a smart phone or tablet. A remotely located, third party communications server 62 and/or transcoder server 66 may be used to provide signaling and transcoding services for the network 14 and associated communications devices 18. The remote transcoder server 66 may handle audio and video transcoding for real time telephone calls, video calls, etc. In one example, the communications server 62 may be operated by a third party communications service provider. The transcoding server 66 may be operated by a transcoding service provider, or may also be operated by the communications service provider. In one example, a large entity which services a significant number of communications end points (e.g. the VOIP phones or computers) may operate a communications server 62 and/or transcoding server 66.

In discussing the tasks that will be handled by the servers 62, 66, it will be appreciated that the tasks implemented by the servers 62, 66 may be implemented by a network of multiple servers. The communications server 62 and transcoder server 66 may be operated as a service to outside organizations 10 and, as such, may operate to support transcoding needs for multiple organizations. If desired, a transcoding server 66 may be operated in a private cloud environment for a single client organization. In a typical deployment, however, the transcoder server 66 operates to service a number of different organizations 10 and may operate through intermediate communications service providers. Communications service providers 62 may contract directly with and provide service or equipment to end user organizations 10 and the transcoder server 62 may provide transcoding to communications service providers 62.

Often, the transcoding service 66 is provided as a multi-tenant deployment model running as a subscription based cloud service, although the transcoding service can be customized to run in a private cloud for a single tenant (e.g. a communication service provider data-center). The transcoding service provider 66 may serve Diverse client types such as WebRTC, Smartphone/Tablet on Wi-Fi/cell data, PSTN, Cellphone, etc. The TSP 66 can support diverse media profiles such as voice coders, video coders/profiles, etc. The TSP 66 can be easily configured to include as many codecs, etc. as are desired and can be easily updated and managed to include new codecs. Accordingly, the TSP server 66 can be dynamically managed to provide for compatibility between call communications devices 18, 46. Along with the ability to provide clients interoperability between all end point communications devices, the TSP server 66 can allow clients to choose how media is transcoded and can provide various billing models based on time-of-day or source device usage scenarios.

Facilitating communication among the diverse end-points currently available requires a constant need for transcoding of various media types. The TSP server 66 can build that capability and can change and scale as client needs grow and technology changes. The CSP server 62 can handle provisioning and reachability of these diverse end-points. CSP server signaling can be agnostic and can be used with SBC/Signaling Proxies running various SIP/H323/MGCP etc. protocols.

The transcoding service provider 66 may cater to one or many Communication Service Providers 62 (CSP). A CSP 62 typically sets up an SLA (service level agreement) with the Transcoder Service Provider 66 (TSP). The TSP 66 assigns a unique identity to the CSP 62 and also provides a Site-Key for any communication to the TSP 66. The CSP 62 uses the Site-Key to authenticate itself to the TSP 66 and, once authorized, the TSP 66 sends a Session-Key to the CSP 62. The CSP 62 then uses the Session-Key to encrypt all the payloads in subsequent media resource reservation requests to the TSP 66. The TSP 66 tracks and logs all media resource requests per tenant (CSP 62). In this example, the CSP 62 only worries about connecting communication end-points and not the media which is exchanged between end points. The CSP 62 can bill the end-customer based on the CSP signaling usage along with the TSP media usage. The TSP 66 listens on a known TCP/UDP port. CSP to TSP communication is either TCP or UDP. UDP may be a preferred default. The TSP 66 provides a TSPLib to the CSP 62 with APIs for the CSP 62 to encode/decode payloads using the Site-Key and Session-key as a convenient way for integrating the TSP service.

In an example implementation, the transcoding service may include a DSP farm. The DSP farm can either be a custom hardware device or can be a software DSP farm with DSP functions running as virtual machines in the cloud as part of the TSP. The TSP 66 will typically include a usage/billing system and may generate reports to indicate individual client usage. As tenants use the media transcoding resources, a billing record is generated for each usage. The billing record may include the time of day, the coder (e.g. codec) used, the profile used for video calls, and a MOS score for a specific communication session if this is desired. The TSP 66 may provide periodic reports of such billing records to the CSP 62. At designated intervals, the account between the CSP 62 and TSP 66 is consolidated and invoices can be generated and transmitted to individual clients of the CSP 62 and/or TSP 66.

The TSP 66 may provide Media Resource Reservation REST APIs (MRR APIs) which may be used by the CSP 62 to reserve a media resource (e.g. a transcoder resource) for use in a communication channel. The TSP 66 may also provide a TSP Dash-board to the CSP 62 which is used to login and track media resource utilizations in real-time and also reserve coder capacities in advance if desired.

Figure 2:
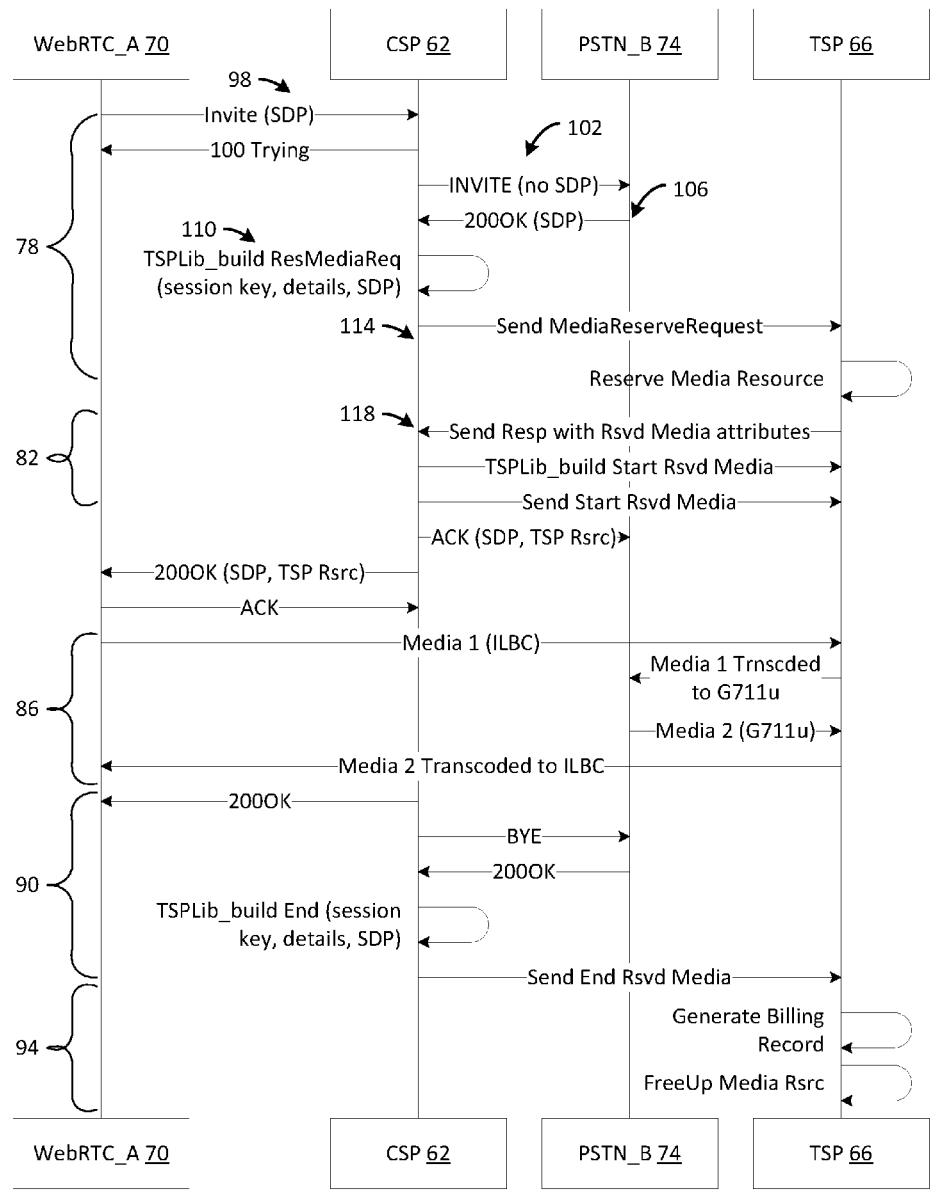
FIGS. 2 through 4 are schematics illustrating various aspects of the computer system.
Figure 3:
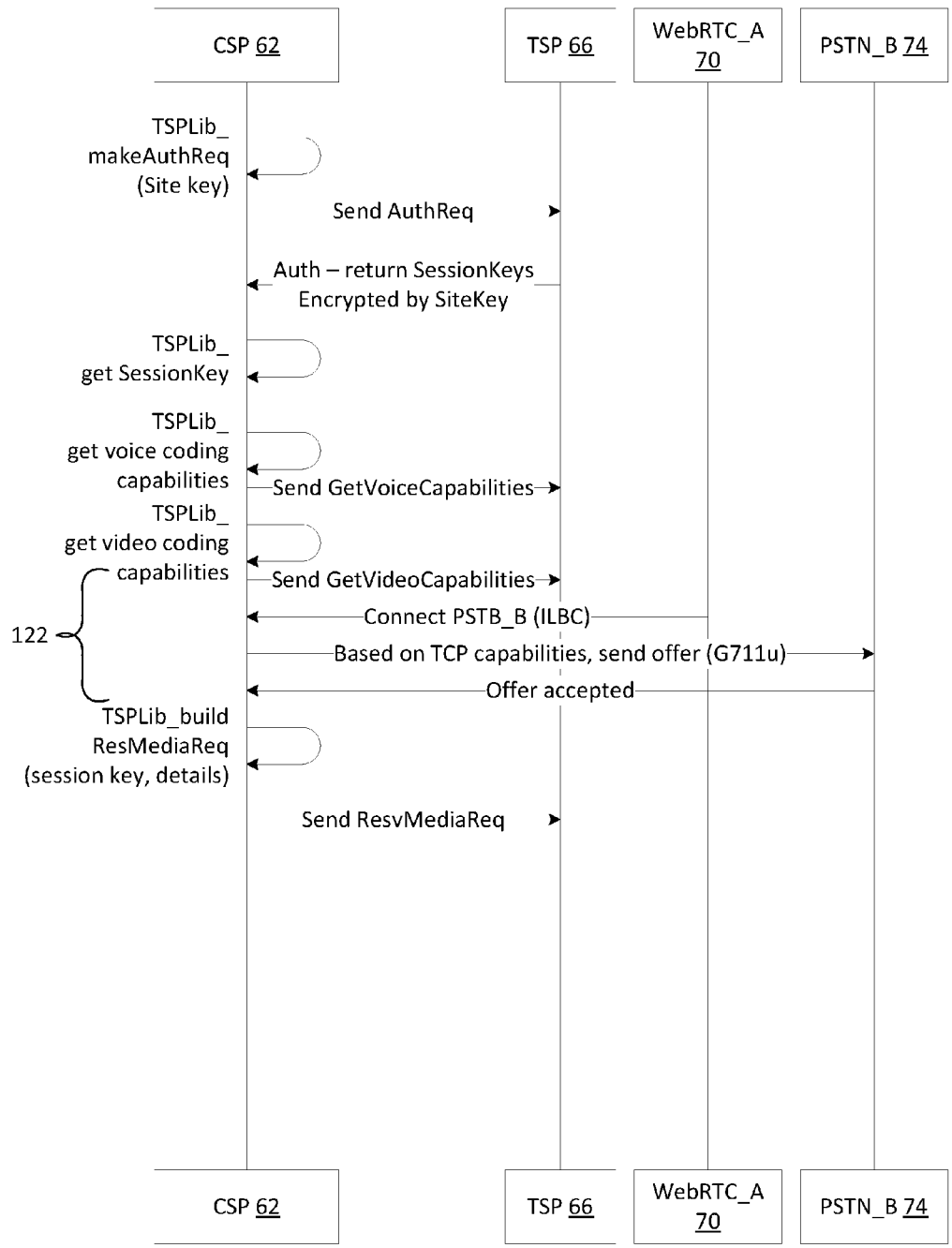
Figure 4:
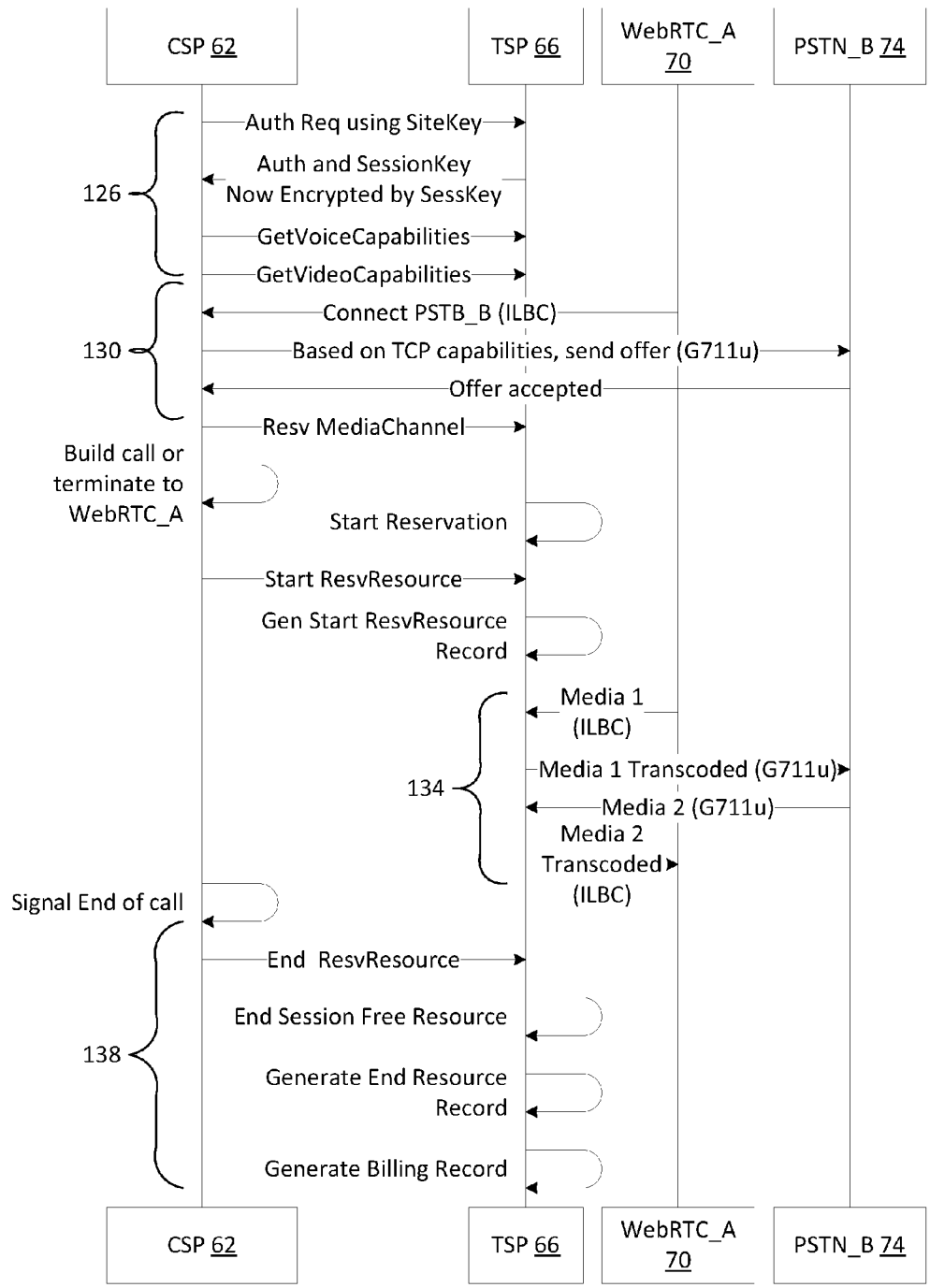
Figure 5:
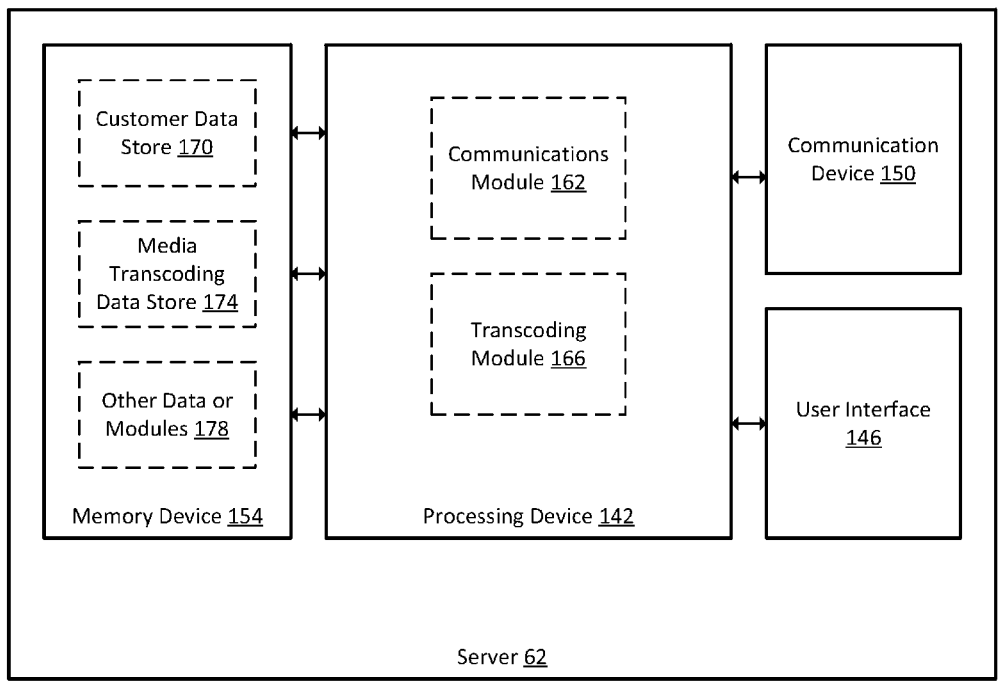
FIG. 5 is a schematic illustrating example components of a server.

Referring now to FIGS. 2 through 4, signaling flow diagrams are shown. The signaling flow diagrams illustrate different aspects of using a remote transcoding server 66. In particular, the diagrams illustrate various aspects of initiating communications between two end points with a transcoding server 66 and communications server as intermediary communications points between the two end points. While the diagrams use a WebRTC client and a PSTN client as example end points, different types of communications equipment may be similarly used at the end points. The diagrams may use the following acronyms:

CSP—Communication Service Provider (e.g. the communications server 62)

TSP—Transcoding Service Provider (e.g. the transcoding server 66)

WebRTC_A—End Point A—An end point communications user who is using the communications server 62 and/or transcoding server 66 to support communications. The End Point A user may, for example, be using WebRTC to communicate.

PSTN_B—End Point B—An end point communications user who is using the communications server 62 and/or transcoding server 66 to support communications. The End Point B user may, for example, be using the Public Switched Telephone Network to communicate.

FIG. 2 illustrates SIP signaling flow for communication between a user (and a communication device 18) at End Point A (indicated at 70 and sometimes referred to simply as A) and a user (and communication device 46) at End Point B (indicated at 74 and often referred to simply as B). The CSP 62 typically represents the communications server 62 and the TSP typically represents the transcoding server 66. It is appreciated that these may both be implemented by the same entity in some examples.

In describing an exemplary SIP signaling model, communication between A and B generally includes initializing a call 78 (e.g. a voice or video call between A and B), reserving media transcoding capacity 82, transmission of call data 86, releasing media transcoding capacity 90 (e.g. ending the call), and billing for media transcoding usage 94. Other signaling protocols such as H.323 or MGCP may be implemented with similar steps to utilize a remote transcoding service as described herein. With exemplary SIP signaling, A may transmit an invite 98 to initiate a call with B. The invite 98 may include information indicating any media transcoding capability which A's communication device 18 possesses. Rather than being transmitted directly to B, the invite 98 is transmitted to the CSP 62. The CSP 62 may transmit 102 the invite to B without information regarding media transcoding capability. B may accept the call request from A as indicated at 106 and may also transmit to the CSP 62 any media transcoding capability which B's communication device 46 possesses. The CSP 62 may create 110 media requirements for a call between A and B. The CSP 62 may determine from the media transcoding capability of A and B how media information should be sent to A and B during a call.

Once media end-points advertised by the two parties in a call are exchanged by signaling, the SBC/Signaling proxy makes a request to the TSP 66 to reserve the Media Resource. The format of the payload may be defined as a JSON document, indicating each media point attributes and the direction of transcoding as media data is sent between the two parties. For example, WebRTC_A 70 may be capable of doing iLBC and listening for media in 192.168.2.1:6000. PSTN_B 74 may be capable of doing G711u and listening for Media on 192.168.3.1:8000. Using the SIP example, when the SBC (session border controller) is sending call data to PSTN_B 74, no SDP (session description protocol-media capability information) will be sent on an Invite signal. When a 200OK signal comes back with SDP, the SBC sends a reservation request to the TSP 66 based on the codec described in the 200OK signal. In a reservation request response, the TSP 66 will send Media attributes that may be then sent in ACK to PSTN_B 74 and in 200OK to WebRTC_A 70. In this way, the TSP 66 may introduce itself in the Media path between PSTN_B 74 and WebRTC_A 70. In this example, the TSP media resources are bound to IP 10.10.10.5. The Data exchange may look like the following CSP→TSP: Reserve Media request payload in JSON format:

```
{
    "Site-Id": 1,
    "Session_id": 100,
    "EndP1": {
        "IP_IN": "192.168.2.1",
        "IP_IN_PORT":6000,
        "CODEC":"iLBC",
```

-continued

```
        "CODEC_BIT_RATE":8000
        "SAMPLE_RATE":20,
        "MOS_GEN":true
    },
    "EndP2": {
        "IP_IN": "192.168.3.1",
        "IP_IN_PORT":8000,
        "CODEC":"G711u",
        "CODEC_BIT_RATE":8000
        "SAMPLE_RATE":10,
        "MOS_GEN":true
    }
```

A TSP→CSP response with TSP media resource information after the reservation may look like:

```
{
    "Site-Id": 1,
    "Session_id": 100,
    "EndP1": {
        "IP_IN": "192.168.2.1",
        "IP_IN_PORT":6000,
        "CODEC":"iLBC",
        "CODEC_BIT_RATE":8000
        "SAMPLE_RATE":20,
        "MOS_GEN":true,
        "TSP_IP_IN":"10.10.10.5",
        "TSP_IP_IN_PORT":1000
    },
    "EndP2": {
        "IP_IN": "192.168.3.1",
        "IP_IN_PORT":8000,
        "CODEC":"G711u",
        "CODEC_BIT_RATE":8000
        "SAMPLE_RATE":10,
        "MOS_GEN":true,
        "TSP_IP_IN":"10.10.10.5",
        "TSP_IP_IN_PORT":2000
    }
}
```

In this example, the TSP 66 will receive iLBC media on 10.10.10.5:1000, transcode that media using EndP2 details, and send that media to 192.168.3.1:8000. In the reverse direction, the TSP 66 will receive G711u media on 10.10.10.5:2000, transcode that using EndP1 details to iLBC, and send to 192.168.2.1:6000. If MOS_GEN is indicated, the TSP 66 will also generate MOS score (mean opinion score) and report that in any billing records generated for the call.

In many cases, the CSP 62 manages communications for the company/entity to which A or A and B pertains. In this situation, the CSP 62 may have a defined policy about media transmission to the End Point A (or A and B). For example, A may desire that call media (video or audio) is transmitted in high quality during low usage times and lower quality during high usage times to maximize internal network resources. A may also desire to optimize cost and may have a policy to use a free codec (typically with a media compression which results in larger data files for a given call quality) during low network usage times and to use a licensed codec (typically with a media compression which results in smaller data files for a given call quality) during high network usage times. Licensed, newer, and/or more expensive codecs often provide improved quality, lower data packet size (via improved compression) or both compared to a given codec. The CSP 62 may thus make media transcoding decisions for A or A and B based on a service agreement and based on network call volume or traffic.

Accordingly, the CSP 62 may identify media transcoding for a call between A and B. For example, the CSP 62 may determine that media sent to A should be transcoded using a G729 codec and media sent to B should be transcoded using a G711 codec. The CSP 62 may then send a request 114 to the TSP 66 to reserve media transcoding capability for a call which transcodes from G729 to G711 and from G711 to G729. The TSP 66 may reserve 118 the appropriate processing resources. These basis steps initialize a call between A and B.

Media transmission for the call between A and B is represented at 86. As is shown, media from A (e.g. voice or video data generated at A for a call between A and B) is sent to the TSP 66. At the TSP 66, media is transcoded from G729 to G711. The TSP 66 then sends the media to B. Media from B (e.g. voice or video data generated at B for a call between A and B) is sent to the TSP 66. The TSP transcodes media from B from G711 to G729. The TSP then transmits the media to A. The call between A and B is handled in this manner with the TSP 66 functioning as an intermediary between A and B. While a single media leg from A to B (via TSP 66) and a single media leg from B to A (via TSP 66) are shown, it is appreciated that a call between A and B will typically include many media legs between A and B as is typical of a telephone call or a video call. When the call between A and B is completed, the TSP will release the transcoding resources used for the call as indicated at 90. The TSP 66 may then create a usage allocation for the call between A and B. The usage allocation may be based on the time of call and the codec being used for the call. The TSP 66 may transmit the usage allocation to the CSP 62 and the CSP may bill the relevant party for the transcoding service used during the call from A to B.

FIG. 3 illustrates aspects of a trusted session between the CSP 62 and TSP 66 and, in particular, shows steps of the CSP 62 authenticating and setting up a session with the TSP 66. As part of an SLA agreement, the TSP 66 may assign a unique ID to the CSP 62 and may also provide Site-Key used for initial trust establishment. Once trust is established, the TSP 66 provides a Session-Key that may be used to encrypt all payloads that are sent to TSP 66. The TSP 66 may provide a library, TSPLib, to the CSP 62. TSPLib may be a set of convenience APIs to help integrating with TSP hand-shake. The CSP 62 may receive information from the TSP 66 regarding the available transcoding capabilities, etc. Accordingly, the CSP 62 may receive a request from A to connect to B, send a call offer to B, receive a call acceptance from B, build transcoding requirements based on the transcoding abilities of the TSP and the media capabilities of A and B, and send a reservation request to the TSP 66 to reserve the media transcoding capacity at the TSP 66. This process is generally indicated at 122.

FIG. 4 shows steps that the CSP 62 may take in utilizing the TSP service 66. While a voice call is shown, a video call will follow similar steps. The CSP 62 may first initiate a session with the TSP 66 and obtain the TSP transcoding capabilities as indicated at 126. The CSP may receive a request from one of the end points 70, 74 to connect with the other end point for a call. Accordingly, the CSP 62 may send an offer to the other end point which includes transcoding capabilities. The other end point may transmit an acceptance of offer to the CSP 62. This process is indicated at 130. Subsequent steps may allocate transcoding resources at the TSP 66 for the call. As is indicated at 134, a voice or video call may be carried out between end point A 70 and end point B 74. For the call, an end point which is transmitting call media data (i.e. voice or video transmission from one person to another person in the call) to the other end point may transmit this media data to the TSP 66, the TSP 66 may transcode the media data from the format used by the transmitting end point into the format used by the recipient end point, and the TSP 66 transmitting the transcoded media data to the recipient end point. As has been discussed, the TSP 66 will thus typically transcode media from one codec to another and vice versa to facilitate transmission of media data between tow end points 70, 74 during a voice or video call. As is indicated at 138, the CSP 62 and TSP 66 may, at the end of the call, release the transcoding capabilities of the TSP 66 and generate a billing record for the end point which is a client of the CSP/TSP for the actual transcoding usage of the call.

Referring now to FIG. 7, a schematic illustrating example components of a communications server 62 is shown. As has been discussed, a single communications server 62 may implement the functionality of the communications server 62 and the transcoding server 66 discussed above. Additionally, the roles of the communications server 62 and the transcoding server 66 may be implemented across multiple servers to expand the capacity of the system. Multiple servers may operate in a scaled deployment to increase capacity. In some examples, the communications server 62 and the transcoding server 66 may be operated by separate service providers.

In one example, the server 62 includes a processing device 142, a user interface 146, a communication device 150, and a memory device 154. It is noted that the server 62 can include other components and some of the components are not required in every example.

The processing device 142 can include memory, e.g., read only memory (ROM) and random access memory (RAM), storing processor-executable instructions and one or more processors that execute the processor-executable instructions. In embodiments where the processing device 142 includes two or more processors, the processors can operate in a parallel or distributed manner. The processing device 142 can execute the operating system of the server 62. In the illustrative example, the processing device 142 may also execute a communications module 162 and/or a transcoding module 166, which may be stored as programmed instructions in the memory device 154 to facilitate operation on the processing device 142.

The memory device 154 may store, as part of the communications module 162 and/or transcoding module 166, a customer data store 170, a media transcoding data store 174, and other data 178 as is necessary.

The communications module 162 allows a server 62 (CSP 62) to facilitate communications between an End Point A 70, End Point B 74, and TSP 66 as has been discussed in the examples herein. The communications module 162 may include a customer data store 170 which includes customer information for entities using the communications module 162 as a service. The customer data store 170 may include customer account information and may include a customer service agreement which indicates communications equipment which a customer has and which indicates customer preferences regarding how media is to be delivered based on end point communications equipment, network load, time of day, etc. The communications module 162 may thus control the manner in which media data for calls is transcoded and delivered to a customer and transmitted from the customer to another communications end point.

The transcoding module 166 allows a server (which may be the same server which functions as a communications server or a different server) to provide transcoding service to a customer as discussed in the examples given herein. The transcoding module 166 allows a server to facilitate communications between End Point A 70 and End Point B 74 as is discussed herein. The transcoding module 166 may include a media transcoding data store 174 which includes computer software necessary for transcoding audio and video transmissions. For example, the media transcoding data store 174 may include a plurality of codecs used by the transcoding module 166/TSP 66. The transcoding module 166 may receive media data received from one End Point, transcode the media data from one codec to another codec, and transmit the media data to another End Point. The communications module 162 and transcoding module 166 allow one or more servers to perform the data transmission, management, and transcoding tasks discussed herein.

The user interface 146 is a device that allows a user to interact with the server 62. While one user interface 146 is shown, the term "user interface" can include, but is not limited to, a touch screen, a physical keyboard, a mouse, a microphone, and/or a speaker. The communication device 150 is a device that allows the server 62 to communicate with another device; such as communications devices 18 and 46. The communication device 150 can include one or more wireless transceivers for performing wireless communication and/or one or more communication ports for performing wired communication such as via the internet 26.

The memory device 154 is a device that stores data generated or received by the server 62 and may provide data to the processing device 142. The memory device 154 can include, but is not limited to, a hard disc drive, an optical disc drive, and/or a flash memory drive. The memory device 154 may include various components which are part of the communications module 162 and transcoding module 166 or used to implement the communications module 162 and transcoding module 166 such as a customer data store 170, media transcoding data store 174, and other data stores or modules 178 as are necessary to implement the various tasks and examples discussed herein.

As had been discussed, the communication system discussed herein provides many advantages. For example, existing communications systems must be built for the worst case scenario in terms of the number of calls it can handle, the data bandwidth, and the ability to transcode data. The cost for each of these features must be realized up front regardless of whether the features or capacity is used or not. Upgrading a communications system after initial assembly typically involves replacing equipment. The present system allows for system hardware limiting factors such as transcoding to be removed from the system and handled remotely. This allows for expansion of system capabilities after install.

Communications systems and communications equipment have long development cycles when there is a change in capacity or capability of the equipment as there is significant time to develop new communication device hardware to implement the new capacity and significant time for end users to replace a system and utilize new technology. The present system allows for immediate adoption of new codecs, etc. and allows for better utilization of existing as well as new communications device hardware. Many advanced (licensed) codecs provide improved compression (smaller compressed data bandwidth) at a given media quality and are advantageous. Licensed codecs thus provide advantages over free codecs. Conventionally, these codecs must be installed into firmware and paid for when a communication device is built, making the customer realize the cost of the codec up front. The cost is realized even if the codec is not used. The present system allows a client to use advanced codecs when necessary on a per use cost basis.

The present system allows the data plane to be separated from the control plane in communication systems. Once initial signaling is completed and a call between two end points is established (the control plane), the media data exchanged between the two end points during the call can be handed off to the TSP 66, separating the data plane. This can reduce the load on the end user networks and on the CSP 62.

Significant cost savings can be realized in the creation of new communications devices such as VOIP phones. Transcoding is CPU intensive and removing transcoding from the end point device can lower CPU cost. This allows the cost of the device to be lowered, or allows for additional quality and features at a given price point. Functions such as signaling and routing are less intensive than transcoding and the present system allows communications equipment manufactures to focus on aspects other than keeping up with the latest transcoding capabilities.

The present system allows for greater interconnectivity between devices. In conventional systems, calls between certain devices are not possible because the transcoding is not supported at one end or both. For example, it may not be possible to call a land line on a PSTN from an internet based device such as a webcam. Employees may want to use tablets or other devices to make calls, but these are not supported by the communications system hardware and firmware. With the present system, the network need only route the call and the TSP server 66 can handle any necessary transcoding to make the call possible.

Conventionally, newer transcoding requirements frequently prevent an entity from adding next generation devices onto an older system with older devices. The present system allows for systems with new and old communications devices and a variety of different communications devices as the TSP 66 can provide interconnectivity between the new devices and old devices. Instead of having a system which is limited to transcoding from A to B and B to A, the system is dynamically upgraded as the TSP 66 implements new codecs.

In conventional systems, communications between devices is limited to commonality in which codecs the devices can support. This may result in communication occurring on old or basic codecs; essentially the lowest common denominator between the devices. If device A can support old codec A and new codec B and device B can support old codec A and new codec C, communication will happen on old codec A. The present system allows for communication between end point devices to happen on any desired codec. A client of the TSP 66 may decide to use particular codecs in receiving and sending call media data based on data bandwidth, cost, call volume, etc. regardless of what codecs another party to the communication may need. The TSP 66 transcodes the media data to allow the client to optimize their media encoding while still allowing communications connectivity with other devices.

With the present system, return on investment for communications equipment is better. Infrastructure utilization is improved. There is no need to overbuild a communications system on transcoding capability and transcoding can be continually adjusted to optimize cost, bandwidth, utilization, etc.

The above description of illustrated examples of the present invention, including what is described in the Abstract, are not intended to be exhaustive or to be limitation to the precise forms disclosed. While specific embodiments of, and examples for, the invention are described herein for illustrative purposes, various modifications are possible without departing from the broader scope of the present invention. Indeed, it is appreciated that the specific examples are provided for explanation purposes and that other values may also be employed in other embodiments and examples in accordance with the teachings of the present invention.

What is claimed is:

1. A computer device, comprising:
   computer hardware having a processor and memory operatively connected to the processor, configured to:
      receive, at a communication module, a call invite from a first communication device to initiate a call with a second communication device, wherein the invite includes an indication of a media coding capability of the first communication device, the media coding capability of the first communication device including at least one codec capability residing on the first communication device and at least one codec capability provided by a transcoding module which is owned, operated, and managed by a different service provider than the first communication device, the second communication device, and the communication module;
      transmit the call invite to the second communication device;
      receive a response to the call invite from the second communication device, which establishes a route of communication between the first communication device and the second communication device, wherein the response includes an acceptance of the call invite and an indication of a media coding capability residing on the second communication device;
      create a media session key identifying the first media coding capability and the second media coding capability;
      submit a request to the transcoding module to reserve, from the transcoding module, a media coding resource matching the media coding capability residing on the second communication device;
      receive a response from the transcoding module confirming reservation of transcoding capability between the first media coding capability and the second media coding capability;
      create, at the transcoding module, a session id corresponding to a media call between the first communication device and the second communication device;
      receive, at the transcoding module, first call media data from the first communication device;
      transcode the first call media data using the at least one codec capability stored on the computer hardware operating the transcoding module without altering the route of communication between the first communication device and the second communication device; and
      transmit the transcoded first call media data to the second communication device.

2. The device of claim 1, wherein the computer device is configured to:
   terminate a media session between the first communication device and the second communication device; and
   create, at the transcoding module, a billing record for the media session between the first communication device and the second communication device according to transcoding usage for the media session between the first communication device and the second communication device.

3. The device of claim 1, wherein the computer device is configured to:
 receive, at the transcoding module, which is owned, operated, and managed by a different service provider than the first communication device, the second communication device, and the communication module, second call media data from the second communication device;
 transcode the second call media data; and
 transmit the transcoded second call media data to the first communication device.

4. The device of claim 1, wherein the first communication device and the communication module are part of an enterprise communications system and wherein the transcoding module is not part of the enterprise communications system and is owned, operated, and managed by a different service provider than the first communication device, the second communication device, and the communication module.

5. The device of claim 1, wherein the transcoding module is implemented on a transcoding server which is owned, operated, and managed by a different service provider than the first communication device, the second communication device, and the communication module.

6. The device of claim 1, wherein the computer device is configured to:
 send the reservation request to the transcoding module to request reservation to expand the media coding capability of the first communication device according to a service agreement covering the first communication device.

7. The device of claim 1, wherein the computer device is configured to:
 send the reservation request to the transcoding module to request reservation to expand the media coding capability of the first communication device based on an available bandwidth on a network associated with the first communication device.

8. The device of claim 6, wherein the computer device is configured to:
 send the reservation request to the transcoding module to request reservation of transcoding capability between the first coding capability and the second coding capability based on the commonality between the media coding capabilities and a time of day.

9. The device of claim 1, wherein the computer device is configured to:
 receive the response to the call invite from the second communication device with media capability including at least one codec capability residing on the second communication device and at least one codec capability provided by the transcoding module which is owned, operated, and managed by a different service provider than the first communication device and the second communication device.

10. A computer system comprising:
 a signaling agnostic transcoding module operating on computer hardware having a processor and memory operatively connected to the processor which is owned, operated, and managed by a different service provider than the communication module and not part of a route of communication between the first communication device and the second communication device;
 a communication module operating on computer hardware having a processor and memory operatively connected to the processor and which is owned, operated, and managed by a different service provider than the transcoding module, the communication module programmed to:
  receive a call invite from a first communication device to initiate a call with a second communication device, wherein the invite includes an indication of a media coding capability of the first communication device, the media coding capability of the first communication device including at least one codec capability residing on the first communication device and at least one codec capability provided by the transcoding module;
  transmit the call invite to the second communication device;
  receive a response to the call invite from the second communication device, which establishes the route of communication between the first communication device and the second communication device, wherein the response includes an acceptance of the call invite and an indication of a media coding capability residing on the second communication device;
  create a media session key identifying the first media coding capability and the second media coding capability;
  submit a request to the transcoding module to reserve a transcoding resource matching the media coding capability residing on the second communication device;
 the transcoding module programmed to:
  transmit a response to the communication module confirming reservation of transcoding capability between the first media coding capability and the second media coding capability;
  create a session id corresponding to a media call between the first communication device and the second communication device;
  receive first call media data from the first communication device;
  transcode the first call media data using at least one available codec capability stored on the computer hardware operating the transcoding module which is not located on the first communication device based on a policy associated with media transmission to the second communication device and without altering the route of communication between the first communication device and the second communication device; and
  transmit the transcoded first call media data to the second communication device.

11. The system of claim 10, wherein the transcoding module is not part of the route of communication between the first communication device and the second communication device and is more specifically programmed to:
 receive second call media data from the second communication device;
 transcode the second call media data; and
 transmit the transcoded second call media data to the first communication device.

12. The system of claim 10, wherein the transcoding module is remote from the communications module and is not part of the enterprise communication.

13. The system of claim 10, wherein the transcoding module is programmed to handle media transcoding without handling call signaling and wherein the communications module is programmed to handle call signaling and routing for the first communications device.

14. The system of claim 10, wherein the communication module is more specifically programmed to:

submit the reservation request to the transcoding module to request reservation of transcoding capability between the first coding capability and the second coding capability irrespective of commonality between the media coding capabilities according to a service agreement covering the first communication device, wherein the transcoding module is not part of the route of communication between the first communication device and the second communication device.

15. The system of claim 14, wherein the communication module is more specifically programmed to:

submit the reservation request to the transcoding module to request reservation of transcoding capability between the first coding capability and the second coding capability based on the commonality between the media coding capabilities and an available bandwidth on a network associated with the first communication device, wherein the transcoding module is not part of the route of communication between the first communication device and the second communication device.

16. The system of claim 10, wherein the communication module is more specifically programmed to:

receive an acceptance of the call invite from the second communication device, wherein the acceptance includes an indication of a media coding capability of the second communication device.

17. The computer system of claim 10, wherein the communication module is more specifically programmed to submit the reservation request to the transcoding module to request reservation of transcoding capability between the first media coding capability and the second media coding capability, upon determining a commonality between the first media coding capability and the second media coding capability and a current processing capability to encode and decode the call media data, wherein the transcoding module is not part of the route of communication between the first communication device and the second communication device, and wherein the reservation request is sent without altering the route of communication between the first communication device and the second communication device.

18. A non-transitory computer-readable medium having instructions stored thereon which, when executed by a processor, cause the processor to:

receive a request from a communication module to reserve transcoding capability between a first media coding capability of a first communication device and a second media coding capability of a second communication device responsive to an acceptance, by the second communication device, to a call invite sent by the first communication device that establishes of a route of communication between the first communication device and the second communication device, wherein the request includes information regarding the first communication device, the second communication device, and a session key identifying the first media coding capability, and the second media coding capability, and wherein the first media coding capability includes at least one codec capability residing on the first communication device and at least one codec capability;

respond to the reservation request with media attributes for the first communication device and the second communication device confirming reservation of transcoding capability between the first media coding capability and the second media coding capability;

receive first call media data from the first communication device;

create a session id corresponding to a media call between the first communication device and the second communication device;

transcode the first call media data without altering the route of communication between the first communication device and the second communication device; and transmit the transcoded first call media data to the second communication device, wherein the computer-readable medium is owned, operated, and managed by a different service provider than the communication module, the first communication device, and the second communication device.

* * * * *